(12) United States Patent
Kumagai et al.

(10) Patent No.: US 11,416,710 B2
(45) Date of Patent: Aug. 16, 2022

(54) FEATURE REPRESENTATION DEVICE, FEATURE REPRESENTATION METHOD, AND PROGRAM

(71) Applicant: NIPPON TELEGRAPH AND TELEPHONE CORPORATION, Tokyo (JP)

(72) Inventors: Kaori Kumagai, Tokyo (JP); Yukito Watanabe, Tokyo (JP); Jun Shimamura, Tokyo (JP); Tetsuya Kinebuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 170 days.

(21) Appl. No.: 16/971,635

(22) PCT Filed: Feb. 25, 2019

(86) PCT No.: PCT/JP2019/007026
§ 371 (c)(1),
(2) Date: Aug. 20, 2020

(87) PCT Pub. No.: WO2019/163985
PCT Pub. Date: Aug. 29, 2019

(65) Prior Publication Data
US 2021/0089827 A1    Mar. 25, 2021

(30) Foreign Application Priority Data

Feb. 23, 2018    (JP) .............................. JP2018-031292

(51) Int. Cl.
*G06K 9/62* (2022.01)
*G06N 3/04* (2006.01)
(Continued)

(52) U.S. Cl.
CPC ......... *G06K 9/6257* (2013.01); *G06K 9/6218* (2013.01); *G06K 9/6234* (2013.01);
(Continued)

(58) Field of Classification Search
CPC .. G06K 9/6257; G06K 9/6218; G06K 9/6234; G06V 10/22; G06N 3/04; G06N 3/08
See application file for complete search history.

(56) References Cited

U.S. PATENT DOCUMENTS 10,437,252 B1 * 10/2019 Liu ..................... G05D 1/0212
10,794,710 B1 * 10/2020 Liu ......................... G06V 10/82
(Continued)

FOREIGN PATENT DOCUMENTS

JP    2014-67174    4/2014

OTHER PUBLICATIONS

Csurka, Gabriella, et al., "Visual Categorization with Bags of Keypoints," In Pro. of ECCV Workshop on Statistical Learning in Computer Vision, May 10, 2004, pp. 59-74.
(Continued)

*Primary Examiner* — Qun Shen

(57) ABSTRACT

The present invention relates to representing image features used by a convolutional neural network (CNN) to identify concepts in an input image. The CNN includes a plurality of filters in each of a plurality of layers. The method generates the CNN based on a set of images for training with predetermined concepts in regions of the set of images. For a select layer of the CNN, the method generates integrated maps, Each integrated map is based on a set of feature maps in a cluster and relevance between the set of feature maps for the select layer and a region representing one of the features in the image data. The method provides a pair of a feature representation visualization image of a feature in the select layer and a concept information associated with the integration map.

20 Claims, 4 Drawing Sheets

(51) Int. Cl.
G06N 3/08 (2006.01)
G06V 10/22 (2022.01)

(52) U.S. Cl.
CPC ............... *G06N 3/04* (2013.01); *G06N 3/08* (2013.01); *G06V 10/22* (2022.01)

(56) References Cited

U.S. PATENT DOCUMENTS

| 2014/0075004 A1* | 3/2014 | Van Dusen | G06Q 30/0201 |
| | | | 709/223 |
| 2018/0247549 A1* | 8/2018 | Martin | G09B 19/00 |
| 2020/0302224 A1* | 9/2020 | Jaganathan | G06N 3/084 |

OTHER PUBLICATIONS

He, Kaiming, et al., "Deep Residual Learning for Image Recognition," In Proc. IEEE Conference on Computer Vision and Pattern recognition (CVPR), Jun. 27, 2016, pp. 770-778.

Selvaraju, Ramprasaath, et al., "Grad-CAM: Visual Explanations from Deep Networks via Gradient-based Localization," arXiv preprint, 1610.02391 v3, Oct. 7, 2016.

Bau, David, et al., "Network Dissection: Quantifying Interpretability of Deep Visual Representations," IEEE Conference on Computer Vision and Pattern Recognition (CVPR) Jul. 21, 2017, pp. 6541-6549.

* cited by examiner

FEATURE REPRESENTATION DEVICE, FEATURE REPRESENTATION METHOD, AND PROGRAM

CROSS-REFERENCE TO RELATED APPLICATIONS

This application is a U.S. 371 Application of International Patent Application No. PCT/JP2019/007026, filed on 25 Feb. 2019, which application claims priority to and the benefit of JP Application No. 2018-031292, filed on 23 Feb. 2018, the disclosures of which are hereby incorporated herein by reference in their entireties.

TECHNICAL FIELD

The present invention relates to a feature representation device, a feature representation method, and a program and, more particularly, to a feature representation device, a feature representation method, and a program that, with respect to an input image, outputs information representing features captured by a specific layer of a CNN.

BACKGROUND ART

In recent years, proliferation of digital cameras and smartphones has allowed for easy image acquisition, and as such images circulate through the Internet, access to images in which diversifying objects are shot in diversifying environments has become easier. In such circumstances, there are many cases where it is unknown what is an object appearing in an image. Such a problem can be solved if it is possible to identify every object from image information and to acquire new information when information about an unknown object is unable to be acquired easily.

As described above, demand has been growing for image identification technology that enables provision of new information from image information.

With respect to the image identification technology, various techniques have been invented and disclosed conventionally. For example, Non-Patent Literature 1 discloses a method based on SIFT (Scale Invariant Feature Transform). In the method, a computer is caused to learn relations between features in images including objects with known names and the names, whereby a newly input image (a query image) is categorized. A very small region called a keypoint is detected from each image, and a SIFT feature amount is calculated for each keypoint. The feature amounts are quantized into codes called Visual Words, and each image is represented by a histogram of frequencies of occurrence of the Visual Words. By causing a computer to learn the obtained histogram as the feature amounts of the image, an unknown query image can be identified.

Similarly, in a technique disclosed in Patent Literature 1, partial images including specific patterns included an image are cut out, and feature amounts of the partial images are calculated. By causing a computer to learn a correspondence between a histogram created from the calculated feature amounts and the image as in Non-Patent Literature 1, an unknown query image can be identified.

According to Non-Patent Literature 1, distinctive points are detected from an input image, and a SIFT feature amount is calculated for each of such keypoints. Similarly, also in the Patent Literature, partial images including specific patterns are cut out from an input image, and a feature amount is calculated for each of the partial images. Accordingly, in these techniques, it is obvious which portion in an image is captured, and a feature amount to be described for an input is predetermined.

Accordingly, when an identification result for an image is obtained, a feature captured from the image can be used to analyze a factor leading to the identification result.

On the other hand, methods based on a Convolutional Neural Network (CNN), as disclosed in Non-Patent Literature 2, are disclosed in large numbers.

In a CNN, convolution processing for outputting a feature map, which is created by applying a feature detection filter to an input image while the filter is slid, and pooling processing for combining extracted features in each local region are iterated. It is known that high identification performance is demonstrated by learning a feature detection filter to suit data and enhancing, by the pooling processing, robustness in terms of positions of the detected features.

Since each filter is automatically learned such that an image will be more accurately discriminated ultimately, it depends on learning data what feature representation an image results in.

Accordingly, a problem arises that when an identification result for an image is obtained, it is difficult to directly use features captured by a CNN to analyze a factor leading to the identification result.

For example, when an error occurs in the identification result, it is difficult to analyze a cause of the error, and such a fact is a major obstacle to commercialization of CNN-based image identification technology.

To overcome the above-described problems, several inventions have been made and disclosed that explain a factor leading to an identification result obtained by a CNN.

For example, a technique is disclosed that aims at clearly visualizing a portion to which a CNN ultimately gives attention in an image (Non-Patent Literature 3).

In Non-Patent Literature 3, gradients indicating degrees of influence on an identification result are obtained for feature maps of a final layer, and a portion to be given attention on the final layer is obtained by using values of the gradients as weights and calculating a linear combination of the weights and the feature maps of the final layer. A user can perceive the portion ultimately given attention when an identification result for an image is obtained.

CITATION LIST

Patent Literature

Patent Literature 1: Japanese Patent Laid-Open No. 2014-67174

Non-Patent Literature

Non-Patent Literature 1: G. Csurka, C. R. Dance, L. Fan, J. Willamowski and C. Bray. "Visual categorization with bags of keypoints" in Pro. Of ECCV Workshop on Statistical Learning in Computer Vision, 2004, pp. 59-74

Non-Patent Literature 2: K. He, X. Zhang, S. Ren, and J. Sun. "Deep residual learning for image recognition." In Proc. IEEE Conference on Computer Vision and Pattern Recognition (CVPR), 2016, pp. 770-778.

Non-Patent Literature 3: R. R. Selvaraju, A. Das, R. Vedantam, M. Cogswell, D. Parikh and D. Batra. "Grad-CAM: Why did you say that? Visual Explanations from Deep Networks via Gradient-based Localization" arXiv: 1610.02391, 2016

SUMMARY OF THE INVENTION

Technical Problem

In Non-Patent Literature 3, a position to which a CNN ultimately gives attention can be presented.

However, since the method is to obtain regions highly relevant to a final output and information about features captured in an image by a CNN cannot be obtained, such features captured in the image by the CNN cannot be used to analyze a factor for an identification result.

Accordingly, with the CNN-based image identification technology, there has been a problem that it cannot be efficiently represented what features in which portion in an image are captured by a CNN.

The present invention is made in view of the foregoing, and an object thereof is to provide a feature representation device, a feature representation method, and a program that make it possible to efficiently represent features in an image used by a CNN to identify the input image.

Means for Solving the Problem

A feature representation device according to the present invention is a feature representation device that, for an input image, outputs information representing features captured by a specific layer of a CNN (Convolutional Neural Network), including: an agreement rate calculation unit that, with respect to each of a plurality of filters used on the specific layer of the CNN, calculates, for each of a plurality of concepts defined in advance, an agreement rate indicating a degree of relevance of a feature map output from the filter of interest when each of a plurality of images in which a region representing each of the plurality of concepts is already obtained is used as an input, with a region representing the concept of interest; a feature map calculation unit that calculates a feature map to be output from each of the plurality of filters when the input image is input into the CNN; a clustering processing unit that classifies the feature map calculated with respect to each of the plurality of filters by the feature map calculation unit into any of a plurality of clusters, based on values in the feature map; an integration map calculation unit that, based on a result of classification of the feature maps by the clustering processing unit and the agreement rates, calculates, for each of the plurality of concepts and for each of the plurality of clusters, an integration map in which a plurality of feature maps classified into the cluster of interest are integrated by using the agreement rates with the concept of the filter outputting the feature maps; a threshold value calculation unit that, with respect to each of the plurality of clusters, calculates, for each of the plurality of concepts, a threshold value based on values in the integration maps calculated by the integration map calculation unit; and a threshold value processing unit that, with respect to each of the integration maps, outputs, in a pair, a feature representation visualization image visualized by using the threshold value and information on the concept corresponding to the integration map of interest.

A feature representation method according to the present invention is a feature representation method of, for an input image, outputting information representing features captured by a specific layer of a CNN (Convolutional Neural Network), including: by an agreement rate calculation unit, with respect to each of a plurality of filters used on the specific layer of the CNN, calculating, for each of a plurality of concepts defined in advance, an agreement rate indicating a degree of relevance of a feature map output from the filter of interest when each of a plurality of images in which a region representing each of the plurality of concepts is already obtained is used as an input, with a region representing the concept of interest; by a feature map calculation unit, calculating a feature map to be output from each of the plurality of filters when the input image is input into the CNN; by a clustering processing unit, classifying the feature map calculated with respect to each of the plurality of filters by the feature map calculation unit into any of a plurality of clusters, based on values in the feature map; by an integration map calculation unit, based on a result of classification of the feature maps by the clustering processing unit and the agreement rates, calculating, for each of the plurality of concepts and for each of the plurality of clusters, an integration map in which a plurality of feature maps classified into the cluster of interest are integrated by using the agreement rates with the concept of the filter outputting the feature maps; by a threshold value calculation unit, with respect to each of the plurality of clusters, calculating, for each of the plurality of concepts, a threshold value based on values in the integration maps calculated by the integration map calculation unit; and by a threshold value processing unit, with respect to each of the integration maps, outputting, in a pair, a feature representation visualization image visualized by using the threshold value and information on the concept corresponding to the integration map of interest.

According to the feature representation device and the feature representation method of the present invention, with respect to each of the plurality of filters used on the specific layer of the CNN, the agreement rate calculation unit calculates, for each of the plurality of concepts defined in advance, an agreement rate indicating a degree of relevance of a feature map output from the filter of interest when each of a plurality of images in which a region representing each of the plurality of concepts is already obtained is used as an input, with a region representing the concept of interest; the feature map calculation unit calculates a feature map to be output from each of the plurality of filters when an input image is input into the CNN; and the clustering processing unit classifies the feature map calculated with respect to each of the plurality of filters by the feature map calculation unit into any of a plurality of clusters, based on values in the feature map.

Then, based on a result of the classification of the feature maps by the clustering processing unit and the agreement rates, the integration map calculation unit calculates, for each of the plurality of concepts and for each of the plurality of clusters, an integration map in which a plurality of feature maps classified into the cluster of interest are integrated by using the agreement rates with the concept of the filter outputting the feature maps; with respect to each of the plurality of clusters, the threshold value calculation unit calculates, for each of the plurality of concepts, a threshold value based on values in the integration maps calculated by the integration map calculation unit; and with respect to each of the integration maps, the threshold value processing unit outputs, in a pair, a feature representation visualization image visualized by using the threshold value and information on the concept corresponding to the integration map of interest.

As described above, with respect to each of a plurality of filters used on a specific layer of a CNN, an agreement rate indicating a degree of relevance of a feature map output from the filter of interest when a plurality of images in which regions representing a plurality of concepts defined in advance are already obtained are used as inputs, with a region representing a concept of interest is calculated for each concept; an integration map in which feature maps are integrated by using the agreement rates with the concept of the filter outputting the feature maps is calculated for each concept and for each of a plurality of clusters, based on the agreement rates and a result of classification of feature maps output from the plurality of filters when an input image is input into the CNN, into each cluster based on values in the feature maps; and feature representation visualization images visualized by using threshold values that are based on values in the integration maps and information on the respective concepts corresponding to the integration maps are output in pairs, whereby features in the image used by the CNN to identify the input image can be efficiently represented.

The integration map calculation unit of the feature representation device according to the present invention can integrate, for each of the plurality of concepts and for each of the plurality of clusters, the plurality of feature maps classified into the cluster of interest, by calculating a linear sum using the agreement rates with the concept of the filter outputting the feature maps.

The integration map calculation unit in the feature representation method according to the present invention can integrate, for each of the plurality of concepts and for each of the plurality of clusters, the plurality of feature maps classified into the cluster of interest, by calculating a linear sum using the agreement rates with the concept of the filter outputting the feature maps.

The feature representation device according to the present invention further includes a resizing processing unit that, for each of the plurality of integration maps, converts a size of the integration map of interest, and the threshold value processing unit can output, in a pair, the feature representation visualization image visualized by using the threshold value and the information on the concept corresponding to the integration map, for each of the integration maps with the sizes converted by the resizing processing unit.

Another feature representation device according to the present invention is a feature representation device that, for an input image, outputs information representing features captured on a specific layer of a CNN (Convolutional Neural Network), including a feature representation unit that, based on each of a plurality of images in which a region representing each of a plurality of concepts defined in advance is obtained beforehand, outputs, with respect to each of the plurality of concepts, information on the concept of interest and a feature representation visualization image in which a region given attention with respect to the concept of interest on the specific layer of the CNN is visualized, in a pair.

Another feature representation method according to the present invention is a feature representation method of, for an input image, outputting information representing features captured on a specific layer of a CNN (Convolutional Neural Network), including, by a feature representation unit, based on each of a plurality of images in which a region representing each of a plurality of concepts defined in advance is obtained beforehand, outputting, with respect to each of the plurality of concepts, information on the concept of interest and a feature representation visualization image in which a region given attention with respect to the concept of interest on the specific layer of the CNN is visualized, in a pair.

According to the feature representation device and the feature representation method of the present invention, based on each of the plurality of images in which a region representing each of the plurality of concepts defined in advance is obtained beforehand, the feature representation unit outputs, with respect to each of the plurality of concepts, information on the concept of interest and a feature representation visualization image in which a region given attention with respect to the concept of interest on the specific layer of the CNN is visualized, in a pair.

As described above, based on each of a plurality of images in which a region representing each of a plurality of concepts defined in advance is obtained beforehand, information on a concept of interest and a feature representation visualization image in which a region given attention with respect to the concept of interest on the specific layer of the CNN is visualized are output in a pair with respect to each of the plurality of concepts, whereby features in an image used by the CNN to identify the input image can be efficiently represented.

A program according to the present invention is a program for causing a computer to function as each unit of any one of the above-described feature representation devices.

Effects of the Invention

According to the feature representation device, the feature representation method, and the program of the present invention, it is possible to efficiently represent features in an image used by a CNN to identify the input image.

DESCRIPTION OF EMBODIMENTS

Figure 1:
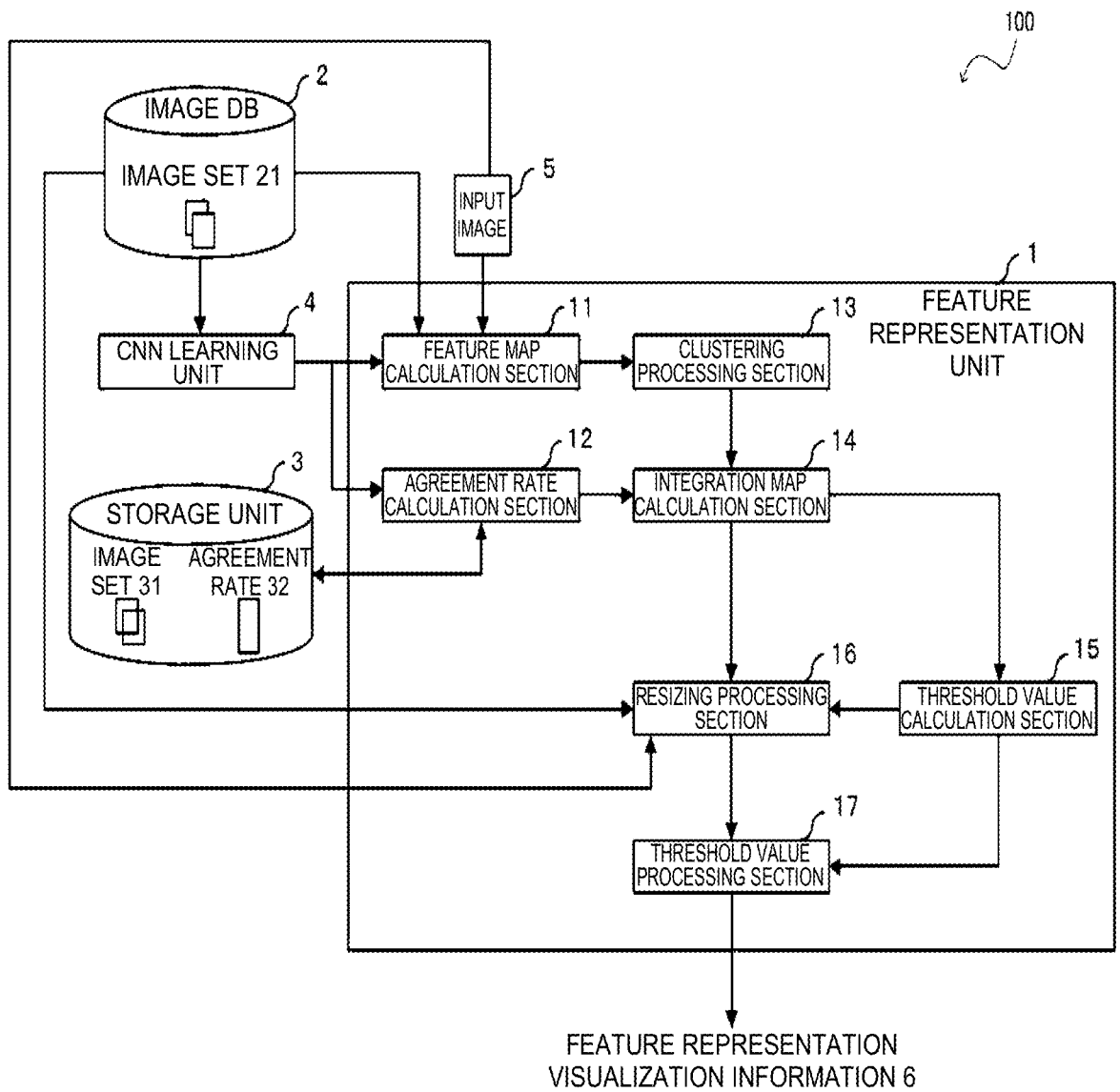
FIG. 1 is a block diagram showing a configuration of a feature representation device according to an embodiment of the present invention.

Hereinafter, an embodiment of the present invention will be described with reference to drawings.

<Outline of Feature Representation Device According to Embodiment of the Invention>

First, an outline of the embodiment of the present invention will be described.

A technique aiming at representing a feature captured by each filter in accordance with a predefined concept has been provided (Reference Literature 1).

[Reference Literature 1] D. Bau, B. Zhou, A. Khosla, A. Oliva, A. Torralba. "Network Dissection: Quantifying Interpretability of Deep Visual Representations" in Proc. IEEE Conference on Computer Vision and Pattern Recognition (CVPR), 2017, pp. 6541-6549.

First, content of the invention according to Reference Literature 1 will be described. An image data set in which labels of concepts existing in each image are associated with binary images indicating regions of the individual concepts, respectively, is prepared. Concepts are broadly divided into six categories including object, part, scene, texture, material, and color, and each category includes a large number of labels. When an image is chosen from the prepared data set and input into a CNN, only a region producing a greater reaction is extracted from a feature map obtained through each filter. For the region, a degree of region overlap (an agreement rate) with each concept-assigned region is calculated. Such agreement rates of regions are calculated for all images in the data set. An agreement rate is a score indicating how easy it is for each filter to capture each concept.

By using the agreement rates, for example, a concept obtaining a largest agreement rate is made to correspond to a filter, and visualization is rendered based on a feature map representing reactions in an image resulting from the filter, whereby a position and a nature of a feature the CNN (Convolutional Neural Network) captures in the image can be visualized. The visualization image can be used to analyze a factor leading to an identification result.

By replacing a feature with a concept by utilizing Reference Literature 1 that makes it possible to represent features captured by a CNN in terms of concepts, a concept captured in an image can be used to analyze a factor leading to an identification result.

However, filters automatically learned within a CNN do not always make one-to-one correspondences with human-defined concepts, and one filter may react on many concepts.

In other words, all concepts existing in an image cannot necessarily be captured by only considering a concept obtaining a high agreement rate. Accordingly, it is necessary to consider a plurality of concepts for one filter.

In addition, there may be a plurality of filters that react on a concept. In other words, a plurality of filters may strongly react on a concept in an image. Accordingly, when all of the regions are simply visualized, as many visualizations as the number of filters x the number of concepts are needed at maximum.

For example, in a case of 4-layer res5c of Residual Network-152 in Reference Literature 1, since 2,453,504 visualizations are needed at maximum on an assumption that the number of filters is 2,048 and the number of concepts is 1,198, such visualizations are redundant and require much human work for visual confirmation.

For the above-described reasons, the foregoing method is insufficient as a method for representing a position and a nature of a feature existing in an image because only one concept can be considered at a time for one filter, and because visualizations become redundant when an attempt is made to consider a plurality of filters and a plurality of concepts for each filter in order to represent concepts existing in an image.

In the present embodiment, with respect to a plurality of filters used on a specific layer of a CNN, a feature representation device can calculate, for each concept, an agreement rate indicating a degree of relevance of each feature map output from the filters when a plurality of images in which regions representing a plurality of concepts defined in advance are obtained are used as inputs, with a region representing the concept of interest. Moreover, based on the agreement rates and a result of classification of feature maps output from the plurality of filters when an input image is input into the CNN, into each cluster based on values in the feature maps, the feature representation device can calculate, for each concept and for each of the plurality of clusters, an integration map in which feature maps are integrated by using the agreement rates with the concept of the filter outputting the feature maps. Further, with respect to integration maps obtained after sizes of the plurality of integration maps are converted, the feature representation device outputs, in pairs, feature representation visualization images visualized by using threshold values that are based on values in the integration maps and information on the respective concepts corresponding to the integration maps of interest, and thus can efficiently represent features in the image used by the CNN to identify the input image.

In other words, an effect can be achieved that positions and natures of features captured by a CNN can be efficiently visualized while a plurality of filters and a plurality of concepts for each of the filters are considered at the same time.

By using the present embodiment in analysis of a cause of erroneous recognition in an image recognition service using a CNN, a user can recognize positions and natures of features captured by the CNN and can easily perform analysis of a factor leading to an identification result, so that a contribution can be made to acceleration of the commercialization of the image identification technology using CNNs.

<Configuration of Feature Representation Device According to Embodiment of the Invention>

A configuration of the feature representation device according to the embodiment of the present invention will be described with reference to FIG. 1. FIG. 1 is a block diagram showing the configuration of the feature representation device according to the embodiment of the present invention.

The feature representation device 100 is configured by using a computer including a CPU, a RAM, and a ROM storing a program for executing a feature representation processing routine, which will be described later, and is functionally configured as described below.

As shown in FIG. 1, the feature representation device 100 according to the present embodiment includes a feature representation unit 1, an image database (DB) 2, a storage unit 3, and a CNN learning unit 4.

The image DB 2 stores an image set 21 that is a set of images.

Each image in the image set 21 is assigned a correct-answer label used in CNN learning. A correct-answer label is, for example, a sequence of letters expressing an object appearing in an image.

It is assumed that a file of each image in the image set 21 is assigned an identifier that can identify each image file, so that an arbitrary file can be referred to. For example, when the number of stored image files is D, a natural number that is not smaller than 1 and not larger than D is assigned to each image.

The storage unit 3 stores an image set 31 that is a set of images. The storage unit 3 may also store an agreement rate calculated by an agreement rate calculation section 12 as an agreement rate 32.

Each of the images in the image set 31 is associated with labels of concepts existing in the image and with binary images indicating regions of the individual concepts. A concept is an attribute of an object appearing in an image, and a label of the concept is a sequence of letters expressing the attribute. Preferably, labels of concepts are broadly divided into the six categories defined in Reference Literature 1, including object, part, scene, texture, material, and color, and an image set including many labels in each category is used.

For a binary image indicating a region of each concept, for example, it is determined through human work which concept each pixel in an image corresponds to, and a map in which is are arranged at positions of pixels corresponding to a concept and 0s are arranged at positions of the other pixels is created for each concept and used.

Each image file in the image set 31 may be an image set that is identical to the image set 21 stored in image DB 2, or may be a different image set.

It is assumed that each image file in the image set 31 is assigned an identifier that can identify the image file, so that an arbitrary file can be referred to. For example, when the number of image files in the image set 31 stored in the storage unit 3 is X, a natural number that is not smaller than 1 and not larger than X is assigned to each image.

The CNN learning unit 4 receives the image set 21 from the image DB 2, learns a CNN that has an arbitrary network structure for identifying an object appearing in an image, for example, Deep Residual Network proposed in Non-Patent Literature 2, and outputs a CNN model.

Here, the CNN model has a network structure of a neural network that iterates a combination of convolution processing and pooling processing, and retains learned parameter information.

Based on each of a plurality of images in which a region representing each of a plurality of concepts defined in advance is obtained beforehand, the feature representation unit 1 outputs, with respect to each of the plurality of concepts, information on the concept of interest and a feature representation visualization image in which a region given attention with respect to the concept of interest on a specific layer of the CNN is visualized, in a pair.

Specifically, with respect to an input image 5 or an image registered in the image DB 2, the feature representation unit 1 generates feature representation visualization information 6 representing where and how features captured by the CNN exist.

The feature representation visualization information 6 includes feature representation visualization images and concept information in pairs. A feature representation visualization image has one channel, and is represented in binary by using numerical values that are either 0 or 1 in some cases, or is represented by using integers that are not smaller than 0 in some cases. A feature representation visualization image is an image represented by using two colors in the case of the binary numerical values, and is a heat-map image in which values are represented by variations in gray levels in the case of the integers that are not smaller than 0.

Figure 2:
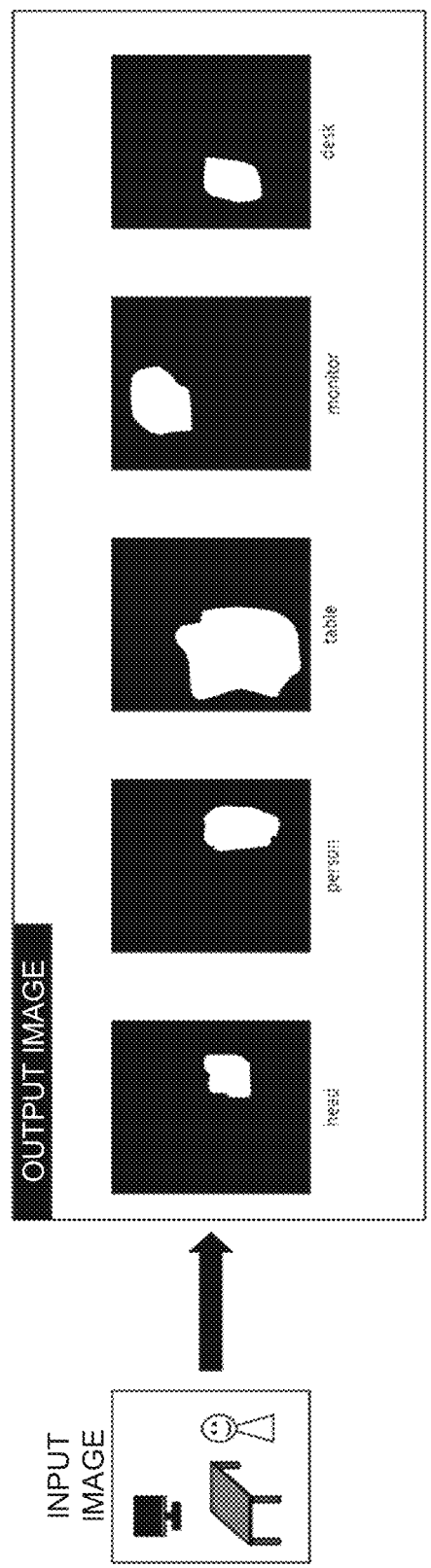
FIG. 2 is an image diagram showing examples of feature representation visualization information according to the embodiment of the present invention.

Information in which each feature representation visualization image is given a corresponding concept is the feature representation visualization information 6. An image diagram of the feature representation visualization information 6 when feature representation visualization images are represented in binary is shown in FIG. 2.

The feature representation unit 1 functionally includes a feature map calculation section 11, the agreement rate calculation section 12, a clustering processing section 13, an integration map calculation section 14, a threshold value calculation section 15, a resizing processing section 16, and a threshold value processing section 17.

With respect to each of the plurality of filters used on the specific layer of the CNN, the agreement rate calculation section 12 calculates, for each of the plurality of concepts, an agreement rate $R_{n,\,c}$ indicating a degree of relevance of a feature map $A_n(x)$ output from the filter n of interest when each of a plurality of images in which a region representing each of the plurality of concepts defined in advance is already obtained is used as an input, with a region representing the concept c of interest.

Specifically, after the image set 31 and the CNN model are received, the agreement rate calculation section 12, with respect to each filter of the CNN model and for each concept, outputs an agreement rate of a large-value region in a feature map $A_n(x)$ of an image x belonging to the image set 31 obtained through the filter n of interest, with a binary image indicating a region of the concept c of interest associated with the image x.

When the images x in the image set 31 stored in the storage unit 3 are input into the CNN model received from the CNN learning unit 4, the agreement rate calculation section 12 collects feature maps $A_n(x)$ with respect to the filters n on an arbitrary layer, for example, the same layer that is used by the feature map calculation section 11. x is a natural number that is not smaller than 1 and not larger than X, and n is a natural number that is not smaller than 1 and not larger than N. That is, N×X feature maps are obtained.

Here, it is assumed that a feature map $A_n(x)$ is a matrix with a size of h×w. For example, when 4-layer res5c of Residual Network-152 in Reference Literature 1 and a Broden dataset are used, the number X of images is 63,305, the number N of filters is 2,048, and therefore 129,648,640 feature maps $A_n(x)$ are obtained. The size of each feature map $A_n(x)$ is 7×7.

Next, for each filter, such a threshold value that divides X×h×w values included in X feature maps at predetermined ratios is calculated.

For example, when the above-described example is used, with respect to a certain filter n, a total number of values included in 63,305 feature maps $A_n(x)$ each with a size of 7×7 is 3,101,945, and a 15,509-th value in a top 0.5% of the values is set as a threshold value.

Ultimately, as many threshold values as the number N of the filters are calculated.

The agreement rate calculation section 12 then performs thresholding on the N×X feature maps $A_n(x)$ by using the N threshold values calculated for the filters, respectively, as boundaries, and obtains N×X maps $M_n(x)$.

With respect to an arbitrary image x in the image set 31 stored in the storage unit 3, a binary image indicating a region of a concept c associated with the image is assumed to be $L_c(x)$. Assuming that an agreement rate with a concept c in case of a filter n is $R_{n,\,c}$, the agreement rate $R_{n,\,c}$ can be obtained based on following expression (1).

[Formula 1]

$$R_{n,c} = \frac{\sum_{x \in X} |M_n(x) \cap L_c(x)|}{\sum_{x \in X} |M_n(x) \cup L_c(x)|} \qquad (1)$$

Here, in the expression (1), ∩ is a subset, ∪, is a union, and |•| is a cardinality of a set.

Since a total sum of the agreement rates $R_{n,\,c}$ for each filter is not equal to the others, normalization may be performed such that a total sum of the agreement rates for each filter becomes 1 (expressing (2) below).

[Formula 2]

$$\sum_{c \in C} R_{n,c} = 1 \qquad (2)$$

Examples of a normalization method that results as in the expression (2) include, for example, a method as in expression (3) below.

[Formula 3]

$$\frac{R_{n,c}}{\sum_{c \in C} R_{n,c}} \quad (3)$$

The agreement rates $R_{n,c}$ may be calculated beforehand, and in such a case, the agreement rates $R_{n,c}$ may be stored as agreement rates 32 in the storage unit 3. When the agreement rates 32 are stored in the storage unit 3, efficiency is achieved because the agreement rate calculation section 12 only needs to acquire the agreement rates 32 from the storage unit 3.

The agreement rate calculation section 12 then outputs the agreement rates $R_{n,c}$ to the integration map calculation section 14.

When an input image x is input into the CNN, the feature map calculation section 11 calculates a feature map $A_n(x)$ to be output from each of the plurality of filters n.

Specifically, the feature map calculation section 11 receives input of an input image 5 and also receives the CNN model from the CNN learning unit 4, and then calculates a feature map $A_n(x)$ with respect to each filter n on an arbitrary layer, for example, a fifth layer when the input image 5 is input into the CNN model.

The feature map calculation section 11 then outputs the calculated feature maps $A_n(x)$ to the clustering processing section 13.

The clustering processing section 13 classifies each feature map calculated with respect to each of the plurality of filters by the feature map calculation section 11, into any of a plurality of clusters, based on a value of the feature map $A_n(x)$.

Specifically, the clustering processing section 13 acquires N feature maps $A_n(x)$ each with a size of h×w from the feature map calculation section 11, and performs clustering to classify the N feature maps $A_n(x)$ into K clusters.

h, w are vertical and horizontal sizes of each feature map $A_n(x)$, respectively, and N is the number of filters on the layer of interest, and h, w, N are defined depending on a CNN model and a layer to be used. For example, in the case of 4-layer res5c of Residual Network-152 in Reference Literature 1, h, w, N are 7, 7, 2,048, respectively.

K is the number of clusters, and it is determined depending on a clustering scheme to be used whether or not there is necessity to preset K.

Here, clustering is processing for combining feature maps with large-value regions that are similar in range, among the feature maps $A_n(x)$.

For the clustering scheme, an example using the k-means method will be illustrated. The number of clusters is a parameter and is set to an arbitrary value. Here, for example, it is assumed that K=5. With respect to each feature map $A_n(x)$, a largest element in the feature map $A_n(x)$ is extracted, and clustering is performed based on coordinates of a position of the largest element, which are calculated assuming that coordinates of a top-left end of the feature map are (0,0).

The clustering scheme does not need to be the k-means method, and various clustering schemes can be adopted, for example, the minimum distance method, hierarchical clustering, and the like.

For a method of representing a large-value region in each feature map $A_n(x)$, coordinates do not need to be those of the largest value, and for example, coordinates of top three points may be used.

Besides, a method may be used in which each feature map $A_n(x)$ is divided into four regions beforehand, and the feature maps $A_n(x)$ are classified depending on which one of the four regions a largest value in each feature map $A_n(x)$ belongs to.

The clustering processing section 13 then outputs the feature maps $A_n(x)$ obtained through the individual filters and classified into the K clusters, to the integration map calculation section 14.

Based on a result of the classification of the feature maps $A_n(x)$ by the clustering processing section 13 and the agreement rates $R_{n,c}$, the integration map calculation section 14 calculates, for each of the plurality of concepts c and for each of the plurality of clusters k, an integration map $$I_c^k \quad \text{[Formula 5]}$$

in which a plurality of feature maps classified into the cluster k of interest are integrated by using the agreement rates $R_{n,c}$ with the concept c of the filter n that outputs the feature maps $A_n(x)$ of interest.

Specifically, based on feature maps $A_n(x)$ acquired from the clustering processing section 13 that are classified into a cluster k, and based on the agreement rates $R_{n,c}$ acquired from the agreement rate calculation section 12, the integration map calculation section 14 calculates an integration map $$I_c^k \quad \text{[Formula 6]}$$

in which the feature maps $A_n(x)$ are integrated.

An integration map $$I_c^k \quad \text{[Formula 7]}$$

is a map representing a degree of presence of each concept c in each cluster k, and can be calculated by integrating feature maps $A_n(x)$, for each cluster k, based on the agreement rates with each concept c. Here, for a method of calculating an integration map $$I_c^k, \quad \text{[Formula 8]}$$

a method can be used in which a linear sum of the feature maps $A_n(x)$ and the agreement rates $R_{n,c}$ is calculated for each cluster k and for each concept c. In such a case, the integration map calculation section 14 calculates, for each cluster k, an integration map $$I_c^k \quad \text{[Formula 9]}$$

based on following expression (4).

[Formula 4]

$$I_c^k = \sum_{n \in N} \gamma_{n,k} R_{n,c} A_n(x) \quad (4)$$

Here, a cluster to which feature maps $A_n(x)$ belong is represented by $\gamma_{n,k}$, and it is assumed that $\gamma_{n,k}=1$ when feature maps $A_n(x)$ belong to a cluster k and otherwise $\gamma_{n,k}=0$.

A linear sum does not necessarily need to be calculated, and an integration map $$I_c^k \quad \text{[Formula 10]}$$

for each cluster k and for each concept c may be calculated by taking a largest value of each element in maps obtained by multiplying the feature maps $A_n(x)$ by the agreement rates $R_{n,c}$. Further, a mean value or a median value may be taken instead of the largest value.

The integration map calculation section 14 then outputs the calculated K×C integration maps $$I_c^k \qquad \text{[Formula 11]}$$

to the threshold value calculation section 15 and the resizing processing section 16.

The threshold value calculation section 15 calculates a threshold value, based on values in integration maps of interest $$I_c^k, \qquad \text{[Formula 12]}$$

each of which is calculated for each of the plurality of concepts c and for each of the plurality of clusters k by the integration map calculation section 14.

Specifically, the threshold value calculation section 15 receives the integration maps $$I_c^k \qquad \text{[Formula 13]}$$

from the integration map calculation section 14 and outputs threshold values each of which divides values in integration maps $$I_c^k \qquad \text{[Formula 14]}$$

in each cluster k at predetermined ratios.

For example, in the case of 4-layer res5c of Residual Network-152 in Reference Literature 1, a size of each integration map is 7×7, the number of concepts is 1,198, the total number of values in integration maps $$I_c^k \qquad \text{[Formula 15]}$$

in each cluster k is 58,702, and a 2,935-th value in top 5% of the values is set as a threshold value. Ultimately, K threshold values are calculated.

The threshold value calculation section 15 then outputs the calculated K threshold values to the resizing processing section 16 and the threshold value processing section 17.

With respect to each of the plurality of integration maps, the resizing processing section 16 converts a size of the integration map $$I_c^k. \qquad \text{[Formula 16]}$$

For example, when it is desired to check alignment of positions in a feature representation visualization image and the input image 5, the resizing processing section 16 converts sizes of (resizes) the K x C integration maps $$I_c^k \qquad \text{[Formula 17]}$$

acquired from the integration map calculation section 14, each into a size of the input image 5 received by the feature map calculation section 11, and outputs the integration maps each with the image size. When it is not necessary to check alignment of positions in a feature representation visualization image and the input image 5, the resizing processing section 16 may output the received integration maps without converting the sizes, for efficiency.

For a method of resizing an image, a known method may be used, and for example, the nearest-neighbor interpolation method or the bilinear interpolation method may be used.

For efficiency, the integration maps $$I_c^k \qquad \text{[Formula 18]}$$

may be narrowed down before size conversion is performed. Narrowing-down methods include, for example, a method in which the threshold value for each cluster k is acquired from the threshold value calculation section 15, and an integration map $$I_c^k \qquad \text{[Formula 19]}$$

that does not include values equal to or larger than the threshold value is deleted, and a method in which largest values in the individual integration maps are compared to each other, and only a predetermined number of top integration maps $$I_c^k \qquad \text{[Formula 20]}$$

in each cluster are retained.

The resizing processing section 16 then outputs the resized integration maps to the threshold value processing section 17.

With respect to each of the integration maps with the sizes converted by the resizing processing section 16, the threshold value processing section 17 outputs, in a pair, a feature representation visualization image visualized by using one of the threshold values calculated by the threshold value calculation section 15 and information on the concept c corresponding to the integration map $$I_c^k. \qquad \text{[Formula 21]}$$

Specifically, the threshold value processing section 17 receives a resized integration map for each concept c and for each cluster k, which is acquired from the resizing processing section 16, and the threshold value for a cluster k of interest, which is acquired from the threshold value calculation section 15, and makes a feature representation visualization image of the integration map in which regions smaller than the threshold value are set to 0.

Next, pairs of such feature representation visualization images and corresponding concept information are output as feature representation visualization information 6.

A feature representation visualization image may be a binary image in which regions satisfying the threshold value are colored in a single color, or may be a heat-map image in which variations in gray levels are represented based on values of regions satisfying the threshold value.

The threshold value processing section 17 then outputs the feature representation visualization information 6.

<Operation of Feature Representation Device According to Embodiment of the Invention>

Figure 3:
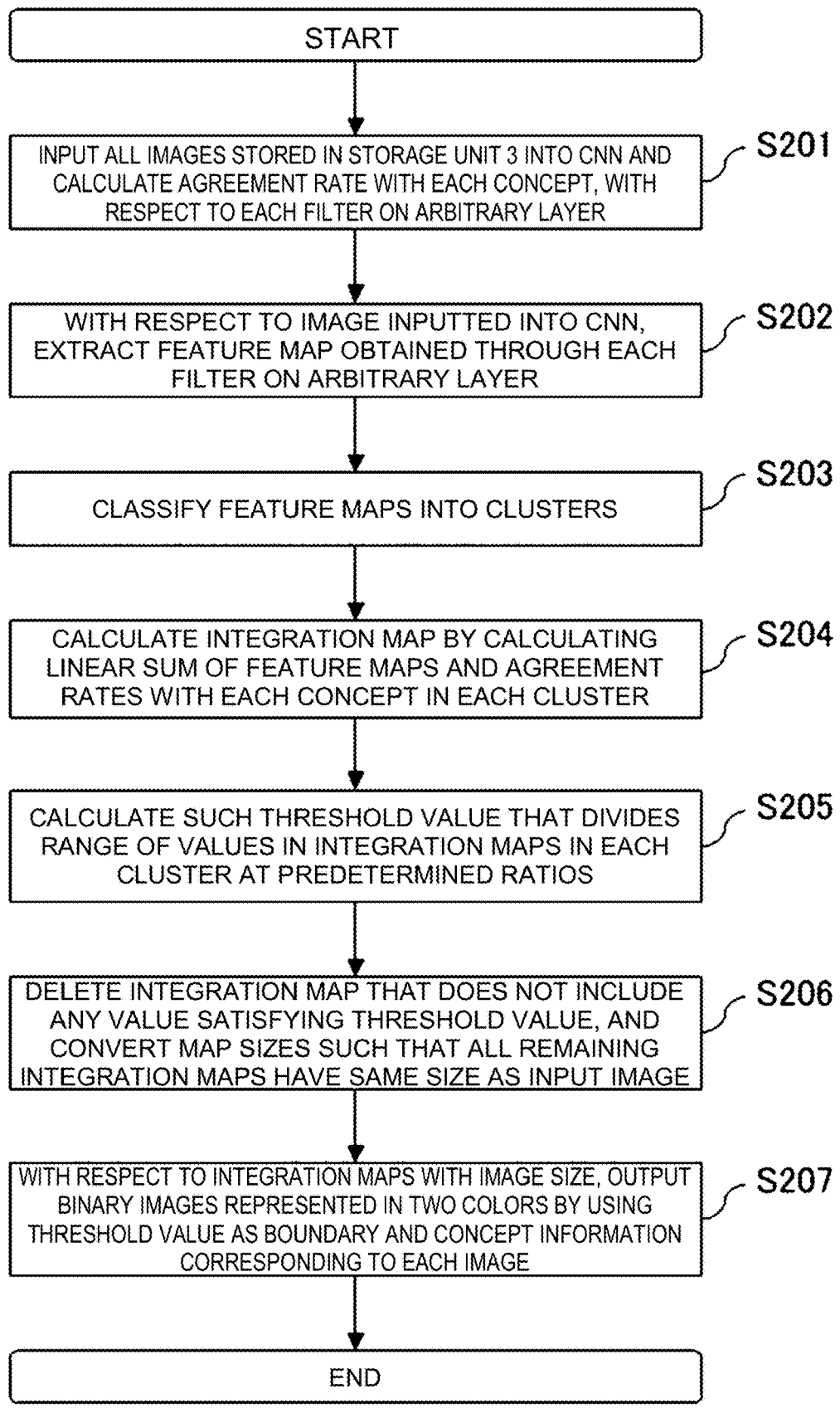
FIG. 3 is a flowchart showing a feature representation processing routine in the feature representation device according to the embodiment of the present invention.
Figure 4:
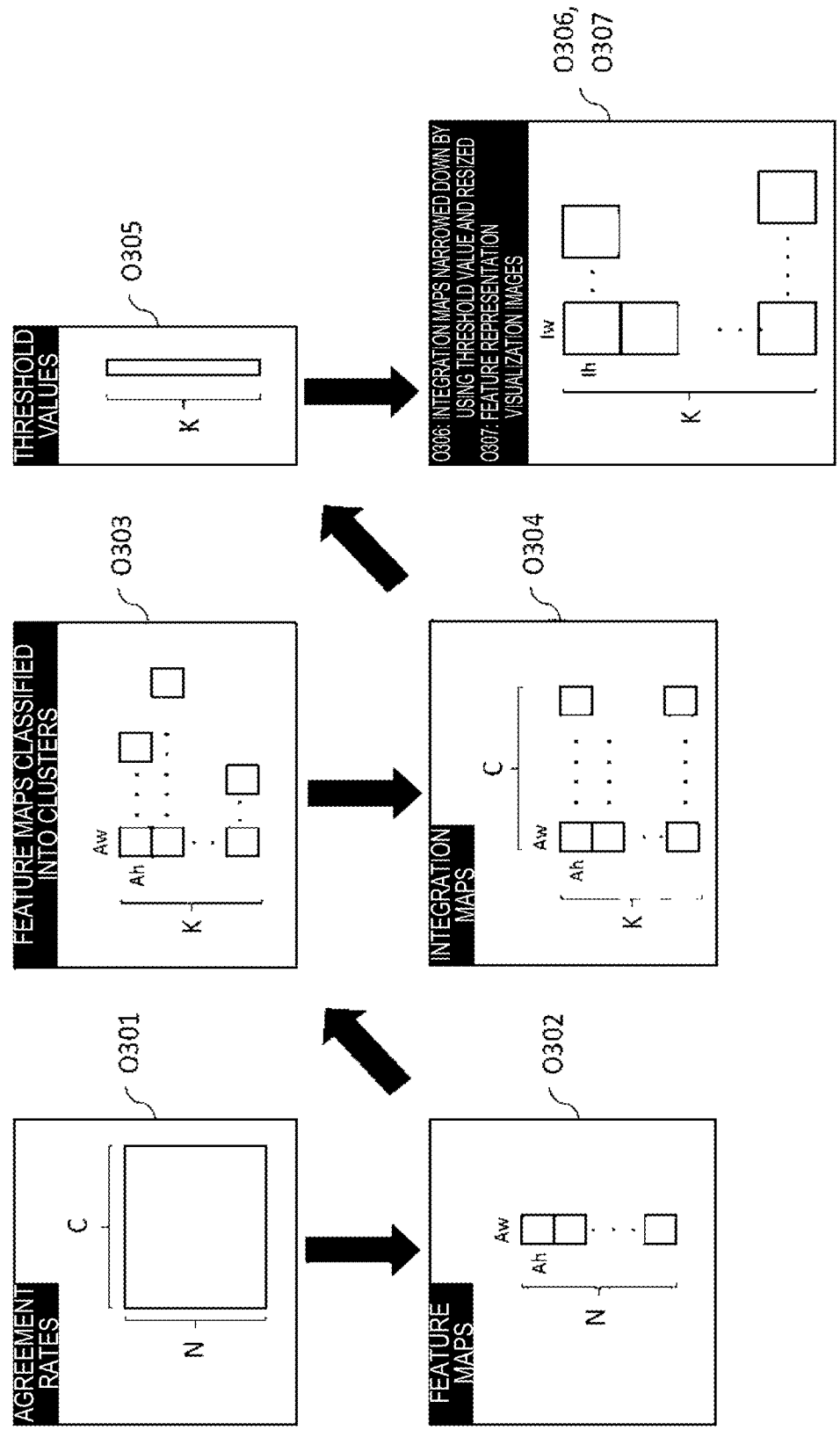
FIG. 4 shows sizes of output data in individual steps of the feature representation processing routine according to the embodiment of the present invention.

FIG. 3 is a flowchart showing the feature representation processing routine according to the embodiment of the present invention. FIG. 4 shows sizes of output data in individual steps of the feature representation processing routine.

First, the CNN learning unit 4 receives the image set 21 from the image DB 2 and learns a CNN for identifying objects existing in images. When an input image 5 is input into the feature map calculation section 11, the feature representation processing routine shown in FIG. 3 is executed.

First in step S201, with respect to each of a plurality of filters used on a specific layer of the CNN, the agreement rate calculation section 12 calculates, for each of a plurality of concepts defined in advance, an agreement rate $R_{n,c}$ indicating a degree of relevance of a feature map $A_n(x)$ output from the filter n of interest when each of a plurality of images in which a region representing each of the plurality of concepts is already obtained is used as an input, with a region representing the concept c of interest. A size of the output agreement rates $R_{n,c}$ is as shown in O301.

Next in step S202, the feature map calculation section 11 calculates a feature map $A_n(x)$ to be output from each of the plurality of filters when the input image 5 is input into the CNN. A size of the output feature maps $A_n(x)$ is as shown in O302.

In step S203, the clustering processing section 13 classifies each feature map obtained in the step S202 that is calculated with respect to each of the plurality of filters, into any of a plurality of clusters, based on values in the feature map $A_n(x)$ of interest. A size of an output result of the classification is as shown in O303.

In step S204, based on the result of the classification of the feature maps $A_n(x)$ obtained in the step S203 and the agreement rates $R_{n,c}$, the integration map calculation section 14 calculates, for each of the plurality of concepts c and for each of the plurality of clusters k, an integration map $$I_c^k \quad \text{[Formula 22]}$$

in which a plurality of feature maps classified into the cluster k of interest are integrated by using the agreement rates $R_{n,c}$ with the concept c of the filter n outputting the feature maps $A_n(x)$. A size of the output integration maps $$I_c^k \quad \text{[Formula 23]}$$

is as shown in O304.

In step S205, with respect to each of the plurality of clusters k, the threshold value calculation section 15 calculates, for each of the plurality of concepts c, a threshold value based on values in the integration maps $$I_c^k \quad \text{[Formula 24]}$$

obtained in the step S204. A size of the output threshold values is as shown in O305.

In step S206, for each of the plurality of integration maps obtained in the step S204, the resizing processing section 16 converts a size of the integration map of interest $$I_c^k. \quad \text{[Formula 25]}$$

A size of the output integration maps after the conversion is as shown in O306.

In step S207, for each of the integration maps with the converted sizes obtained in the step S206, the threshold value processing section 17 outputs feature representation visualization information 6 that is a pair of a feature representation visualization image visualized by using one of the threshold values obtained in the step 205 and information on the concept c corresponding to the integration map of interest $$I_c^k. \quad \text{[Formula 26]}$$

A size of the output feature representation visualization information 6 is as shown in O307.

As described above, with respect to a plurality of filters used on a specific layer of a CNN, the feature representation device according to the present embodiment can calculate, for each concept, an agreement rate indicating a degree of relevance of a feature map output from the filter of interest when a plurality of images in which regions representing a plurality of concepts defined in advance are already obtained are used as inputs, with a region representing the concept of interest. Moreover, based on the agreement rates and a result of classification of feature maps output from the plurality of filters when an input image is input into the CNN, into each cluster based on values in the feature maps, the feature representation device can calculate, for each concept and for each of the plurality of clusters, an integration map in which feature maps are integrated by using the agreement rates with the concept of the filter outputting the feature maps. Further, the feature representation device can efficiently represent features in the image used by the CNN to identify the input image, by outputting, in pairs, feature representation visualization images visualized by using threshold values that are based on values in the integration maps, and information on the respective concepts corresponding to the integration maps of interest.

Note that the present invention is not limited to the above-described embodiment, and various changes and applications can be made without departing from the scope of the invention.

In the description of the present application, although the embodiment in which a program is preinstalled is described, it is also possible to provide the program by storing the program in a computer-readable recording medium.

REFERENCE SIGNS LIST

1 Feature representation unit
2 Image DB
3 Storage unit
4 CNN learning unit
5 Input image
6 Feature representation visualization information
11 Feature map calculation section
12 Agreement rate calculation section
13 Clustering processing section
14 Integration map calculation section
15 Threshold value calculation section
16 Resizing processing section
17 Threshold value processing section
21 Image set
31 Image set
32 Agreement rate
100 Feature representation device

The invention claimed is:

1. A computer-implemented method for processing image data, the method comprising:
   receiving, by a convolutional neural network (CNN), a set of image data for training identification of one or more known concepts in the set of image data, wherein the CNN includes a plurality of layers, wherein each layer at least relates to one or more features of the input image, and wherein the each layer includes a plurality of filters;
   generating a first set of feature maps for each of the plurality of filters in a predetermined layer of the CNN, wherein each feature map in the first set of feature maps relates to one of the set of image data including one or more regions depicting one or more of predetermined concepts;
   receiving an input image data;
   for each filter of the plurality of filters in the predetermined layer of the plurality of layers, generating a second set of feature maps of the input image data, the second set of feature maps associated with each filter of the plurality of filters in the predetermined layer of the CNN;
   generating, for each of the one or more filters, a set of agreement rates, each agreement rate corresponding to each of the plurality of features, the each agreement rate indicating a degree of relevance between the generated feature maps for the predetermined layer and a region representing the one of the plurality of features;
   classifying, based on respective values of the set of feature maps, the set of feature maps of into one of clusters;
   generating a set of integration maps, each integration map representing an integration map for each feature of the plurality of features in respective clusters, the each integration map based at least on the classified set of feature maps and corresponding one agreement rate of the generated set of agreement rates;

generating a feature representation visualization image of a feature in the layer, wherein the feature representation visualization image visualizes a feature based on a threshold according to the set of integration maps; and providing a pair of the feature representation visualization image and a concept information associated with the integration map.

2. The computer-implemented method of claim 1, the method further comprising:

generating, for each of the plurality of concepts in each of the plurality of clusters, the set of integration maps using a linear sum based on the agreement rate corresponding to the filter that relates to one feature map of the plurality of feature maps in a cluster.

3. The computer-implemented method of claim 1, the method further comprising:

resizing a size of one or more integration maps of the set of integration maps; and generating the feature representation visualization image based on the resized one or more integration maps of the set of integration maps.

4. The computer-implemented method of claim 1, wherein the feature representation visualization image is based on one of:

a binary image representation using a range of values of zero (0) and one (1) for expression in two colors, or a heat map image representation, each pixel expressed by an integer with a value at least zero (0) for a grayscale expression.

5. The computer-implemented method of claim 1, wherein the CNN includes a network structure of a neural network, and wherein the neural network iterates a combination of convolution processing and pooling processing while retaining leant parameter information.

6. The computer-implemented method of claim 1, wherein the set of image data for training includes a set of answer labels, and wherein each answer label includes a textual description of a concept in a corresponding image data in the set of image data for training.

7. A system for processing image data, the system comprises:

a processor; and a memory storing computer-executable instructions that when executed by the processor cause the system to:

receive, by a convolutional neural network (CNN), a set of image data for training identification of one or more known concepts, wherein the CNN includes a plurality of layers, wherein each layer at least relates to one or more features of the input image, and wherein the each layer includes a plurality of filters;

generate a first set of feature maps for each of the plurality of filters in a predetermined layer of the CNN, wherein each feature map in the first set of feature maps relates to one of the set of image data including one or more of predetermined concepts depicted regions of the one of a plurality of images;

receive an input image data;

for each filter of the plurality of filters in the predetermined layer of the plurality of layers, generate a second set of feature maps of the input image data, the second set of feature maps associated with each filter of the plurality of filters in the predetermined layer of the CNN;

generate, for each of the one or more filters, a set of agreement rates, each agreement rate corresponding to each of the plurality of features, the each agreement rate indicating a degree of relevance between the generated feature maps for the predetermined layer and one region representing the one of the plurality of features;

classify, based on respective values of the set of feature maps, the set of feature maps of into one of clusters;

generate a set of integration maps, each integration map representing an integration map for each feature of the plurality of features in respective clusters, the each integration map based at least on the classified set of feature maps and corresponding one agreement rate of the generated set of agreement rates;

generate a feature representation visualization image of a feature in the layer, wherein the feature representation visualization image visualizes a feature based on a threshold according to the set of integration maps; and provide a pair of the feature representation visualization image and a concept information associated with the integration map.

8. The system of claim 7, the computer-executable instructions when executed further causing the system to:

generate, for each of the plurality of concepts in each of the plurality of clusters, the set of integration maps using a linear sum based on the agreement rate corresponding to the filter that relates to one feature map of the plurality of feature maps in a cluster.

9. The system of claim 7, the computer-executable instructions when executed further causing the system to:

resize a size of one or more integration maps of the set of integration maps; and generate the feature representation visualization image based on the resized one or more integration maps of the set of integration maps.

10. The system of claim 7, wherein the concepts include a category of an object as one of a plurality of categories, and wherein the category of an object includes a plurality of labels associated with the object.

11. The computer-implemented method of claim 10, wherein the concepts include a category of an object as one of a plurality of categories, and wherein the category of an object includes a plurality of labels associated with the object.

12. The system of claim 7, wherein the feature representation visualization image is based on one of:

a binary image representation using a range of values of zero (0) and one (1) for expression in two colors, or a heat map image representation, each pixel expressed by an integer with a value at least zero (0) for a grayscale expression.

13. The system of claim 7, wherein the CNN includes a network structure of a neural network, and wherein the neural network iterates a combination of convolution processing and pooling processing while retaining leant parameter information.

14. The system of claim 7, wherein the set of image data for training includes a set of answer labels, and wherein each answer label includes a textual description of a concept in a corresponding image data in the set of image data for training.

15. A computer-readable non-transitory recording medium storing computer-executable instructions that when executed by a processor cause a computer system to:

receive, by a convolutional neural network (CNN), a set of image data for training identification of one or more known concepts, wherein the CNN includes a plurality of layers, wherein each layer at least relates to one or more features of the input image, and wherein the each layer includes a plurality of filters;

generate a first set of feature maps for each of the plurality of filters in a predetermined layer of the CNN, wherein each feature map in the first set of feature maps relates to one of the set of image data including one or more of predetermined concepts depicted regions of the one of a plurality of images;

receive an input image data;

for each filter of the plurality of filters in the predetermined layer of the plurality of layers, generate a second set of feature maps of the input image data, the second set of feature maps associated with each filter of the plurality of filters in the predetermined layer of the CNN;

generate, for each of the one or more filters, a set of agreement rates, each agreement rate corresponding to each of the plurality of features, the each agreement rate indicating a degree of relevance between the generated feature maps for the predetermined layer and one region representing the one of the plurality of features;

classify, based on respective values of the set of feature maps, the set of feature maps of into one of clusters;

generate a set of integration maps, each integration map representing an integration map for each feature of the plurality of features in respective clusters, the each integration map based at least on the classified set of feature maps and corresponding one agreement rate of the generated set of agreement rates;

generate a feature representation visualization image of a feature in the layer, wherein the feature representation visualization image visualizes a feature based on a threshold according to the set of integration maps; and provide a pair of the feature representation visualization image and a concept information associated with the integration map.

16. The computer-readable non-transitory recording medium of claim 15, the computer-executable instructions when executed further causing the system to:

generate, for each of the plurality of concepts in each of the plurality of clusters, the set of integration maps using a linear sum based on the agreement rate corresponding to the filter that relates to one feature map of the plurality of feature maps in a cluster.

17. The computer-readable non-transitory recording medium of claim 15, the computer-executable instructions when executed further causing the system to:

resize a size of one or more integration maps of the set of integration maps; and generate the feature representation visualization image based on the resized one or more integration maps of the set of integration maps.

18. The computer-readable non-transitory recording medium of claim 15, wherein the concepts include a category of an object as one of a plurality of categories, and wherein the category of an object includes a plurality of labels associated with the object.

19. The computer-readable non-transitory recording medium of claim 15, wherein the feature representation visualization image is based on one of:

a binary image representation using a range of values of zero (0) and one (1) for expression in two colors, or a heat map image representation, each pixel expressed by an integer with a value at least zero (0) for a grayscale expression.

20. The computer-readable non-transitory recording medium of claim 15, wherein the set of image data for training includes a set of answer labels, and wherein each answer label includes a textual description of a concept in a corresponding image data in the set of image data for training.

* * * * *